3,226,411
ISOCYANATES STABILIZED WITH POLYBUTYL-
ATED 4,4'-ISOPROPYLIDENE BISPHENOL
Eric Smith, New Haven, Conn., assignor to Olin Mathieson Chemical Corporation, a corporation of Virginia
No Drawing. Filed Mar. 20, 1963, Ser. No. 266,478
6 Claims. (Cl. 260—453)

This invention relates to organic isocyanate compounds stabilized against discoloring, and to the process for preparing them.

Organic isocyanates have been used extensively as a reactant in processes for the preparation of polyurethane surface coatings and the like. One problem encountered in such processes is that organic isocyanates, such as toluene diisocyanate, become discolored when stored for extended periods prior to use. The normally colorless isocyanate develops a deep yellow color after extended storage periods. One reason that such discolored organic isocyanates are undesirable is because they impart an undesirable yellow color to the resulting polyurethane surface coating. Various additives have been employed to stabilize the organic isocyanates against discoloring. However, in general, these additives are either too expensive because large proportions of the additives are required to effect the desired degree of stabilization, or else the additives are not effective for extended periods of storage.

It is a primary object of this invention to provide organic isocyanate compositions stabilized against discoloring.

Another object of the invention is to provide toluene diisocyanate compositions stabilized against discoloring.

A further object of the invention is to provide a process for stabilizing organic isocyanates against discoloring.

It is another object of the invention to provide a process for stabilizing toluene diisocyanate against discoloring.

These and other objects of the invention which overcome the disadvantages of the prior art will be apparent from the following detailed description of the invention.

It has now been discovered that the aforesaid objects can be accomplished when an organic isocyanate is admixed with a stabilizing proportion of a polybutylated 4,4'-isopropylidene bisphenol of the formula

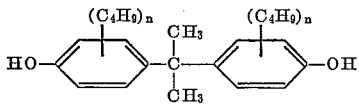

where $n$ is a number between 1 and 4.

The stabilizing proportion of the butylated bisphenol is generally between about 10 and about 2000 parts, and preferably between about 25 and about 1500 parts per million by weight of the organic isocyanate. However, any proportion of the butylated bisphenol stabilizer capable of effecting stabilization without adversely diluting the organic stabilizer may be employed.

Liquid polybutylated 4,4'-isopropylidene bisphenol is readily admixed with liquid organic isocyanates simply by agitating the stabilizing proportion of the bisphenol compound in the organic isocyanate. When the compound isocyanate is a solid at ambient temperature it is heated to effect melting thereof and then admixed together with the stabilizer in a liquid state.

Typical examples of organic isocyanates which can be stabilized in accordance with the technique of this invention include 2,4'-toluene diisocyanate,
2,6-toluene diisocyanate,
4,4'-methylenediphenylisocyanate,
4,4'-methylenedi-ortho-tolylisocyanate,
2,4,4'-triisocyanatodiphenylether,
toluene-2,4,6-triisocyanate,
1-methoxy-2,4,6-benzenetriisocyanate,
meta-phenylenediisocyanate,
4-chloro-meta-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
4,4'-methylene-bis(cyclohexylisocyanate),
1,5-tetrahydronaphthalenediisocyanate,
ortho-, meta- or para-tolueneisocyanate,
alpha and beta-naphthyleneisocyanate,
4-methoxy-meta-phenylenediisocyanate, and the like.

Organic isocyanate stabilized in accordance with the technique of this invention can be stored for several months without appreciable discoloring.

The following examples are presented to further illustrate the invention without any intention of being limited thereby. All parts and percentages are by weight unless otherwise specified.

*Examples I–II*

Four vials having a capacity of 16 milliliters were employed in carrying out these examples. The vials were cleaned, dried and the screw caps were lined with aluminum foil. Each vial was filled with 10 milliliters (12.2 grams) of colorless toluene diisocyanate which contained 80 percent 2,4-toluene diisocyanate and 20 percent 2,6-toluene diisocyanate. To each of two vials was added polybutylated 4,4'-isopropylidene bisphenol stabilizer compound in the proportion indicated below in the table. No stabilizer was added to the remaining two vials. After securing the caps to the vials they were allowed to stand at room temperature for the period indicated in the table. The table also sets forth the color of the sample obtained after storage.

| Example | Proportion of Stabilizer Grams | Storage Period, Days | Appearance after Storage Period |
|---|---|---|---|
| I | 0.0144 | 21 | Colorless. |
| II | 0.0163 | 35 | Do. |

For purposes of comparison, one of the vials to which no stabilizer had been added was slightly discolored after 4 days and had a deep yellow color after 21 days. The other unstabilized sample was colored yellow after standing 2½ days.

*Example III*

To determine the effectiveness of polybutylated 4,4'-isopropylidene bisphenol as a stabilizer for toluene diisocyanate in the presence of fluorescent light, one sample of toluene diisocyanate containing the stabilizer was stored in an 8-ounce clear bottle under fluorescent light at a distance of about 8 feet from the light source for a period of about 80 days. The bottle was shielded against sunlight so that the effect of the fluorescent light could be established. The concentration of the bisphenol stabilizer was 50 parts per million.

After storing the sample for about 80 days, the color was determined in accordance with the procedure set forth in ASTM D1638–61T wherein the color is compared with various concentrations of aqueous solutions of potassium chloroplatinate. In this method aqueous solutions of various concentrations of a standard solution prepared from potassium chloroplatinate, hydrochloric acid, cobaltous chloride, and water are prepared and assigned a number, the lower number representing the lower concentration of the standard solution. The sample to be measured is then compared with the various standard solutions. The bottle which contained the bisphenol stabilizer had a color number of about 25. For purposes of comparison a control sample which contained no stabilizer was stored under the same conditions and was found to have a color number of about 45.

Various modifications of the invention may be employed without departing from the spirit of the invention.

I claim:

1. An organic isocyanate containing a stabilizing proportion of a polybutylated 4,4'-isopropylidene bisphenol having the formula

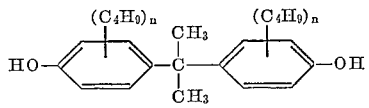

wherein $n$ is a number between 1 and 4.

2. The composition of claim 1 wherein the stabilizing proportion of polybutylated 4,4'-isopropylidene bisphenol is between about 10 and about 2000 parts per million by weight.

3. The composition of claim 1 wherein the stabilizing proportion of polybutylated 4,4'-isopropylidene bisphenol is between about 25 and about 1500 parts per million by weight.

4. Toluene diisocyanate composition stabilized against discoloring comprised of toluene diisocyanate containing a stabilizing proportion of polybutylated 4,4'-isopropylidene bisphenol having the formula

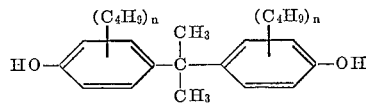

wherein $n$ is a number between 1 and 4.

5. The composition of claim 4 wherein the stabilizing proportion of polybutylated 4,4'-isopropylidene bisphenol is between about 10 and about 2000 parts per million by weight.

6. The composition of claim 4 wherein the stabilizing proportion of polybutylated 4,4'-isopropylidene bisphenol is between about 25 and about 1500 parts per million by weight.

References Cited by the Examiner

UNITED STATES PATENTS

| | | | |
|---|---|---|---|
| 2,086,418 | 7/1937 | Hunt et al. | 252—300 X |
| 3,115,463 | 12/1963 | Orloff et al. | 252—400 X |

FOREIGN PATENTS 565,574 11/1958 Canada.

CHARLES B. PARKER, *Primary Examiner.*

IRVING MARCUS, *Examiner.*